Nov. 4, 1958 C. B. HOUSE 2,859,289

TRANSISTOR CONTROLLED MAGNETIC AMPLIFIER

Filed Dec. 22, 1955

INVENTOR
CLARENCE B. HOUSE

BY W. R. Mattox
Richard C. Reed
ATTORNEYS

United States Patent Office 2,859,289

Patented Nov. 4, 1958

2,859,289

TRANSISTOR CONTROLLED MAGNETIC AMPLIFIER

Clarence B. House, Arlington, Va.

Application December 22, 1955, Serial No. 554,905

3 Claims. (Cl. 179—171)

(Granted under Title 35, U. S. Code (1952), sec. 266)

The invention described herein may be manufactured and used by or for the Government of the United States of America for governmental purposes without the payment of any royalties thereon or therefor.

This invention relates generally to magnetic amplifiers and more particularly to control circuits for magnetic amplifiers.

Among the advantages of magnetic circuitry, ruggedness and durability are most prominent. To benefit from these advantages in magnetic amplifier circuits all components must have similar qualities. The utility of magnetic amplifiers could be extended by introducing vacuum tube circuits with their inherent greater flexibility to magnetic amplifier control circuits. However such an association would also introduce to the combination the inherent fragility of vacuum tubes. In addition the relatively high impedance of vacuum tubes would add impedance matching problems. This invention is directed to accomplishing flexibility without sacrifice of ruggedness and durability. It has been found that transistors possess many features amenable to magnetic circuits. They have no fragile filaments or cathodes to wear out and their inherent low impedance renders them more readily adaptable.

It is accordingly an object of this invention to provide a versatile control circuit for magnetic amplifiers.

It is another object of this invention to provide a magnetic amplifier control circuit using transistors.

It is another object of this invention to provide a transistor controlled half cycle response time magnetic amplifier.

It is a further object of this invention to provide a transistor controlled half cycle response time magnetic amplifier including a compensating circuit for transistor and core characteristics.

It is still another object of this invention to provide a compensating circuit for transistor controlled magnetic amplifiers.

Other objects and advantages of this invention will be apparent from the following description and accompanying drawings wherein.

Briefly, this invention provides a transistor circuit as the control device for a half cycle response time magnetic amplifier by placing a transistor collector circuit in series with a unilateral impedance, a control winding, and the alternating source. The transistor may be connected either with "common base" or "common emitter." The amplifier will respond to control information introduced to the remaining electrode of the transistor. Any no signal transistor current can be compensated by a biased control winding.

Figure 1:
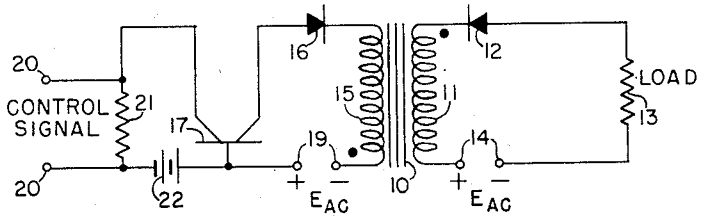
Fig. 1 is a schematic diagram of this invention.

Referring now to the drawings in detail, Fig. 1 is a schematic diagram of a representative embodiment of this invention. A magnetic core 10 of substantially square loop material is shown with two windings 11 and 15. Winding 11 is the output or load winding and is wound with a polarity indicated by the dot at the upper end of the winding. It is utilized in a series circuit comprised of a rectifier 12, a load impedance 13 and the terminals 14 connected to the source of alternating power. In accordance with standard magnetic amplifier operation, the current entering terminals 14 can be delivered to load 13 only during the half cycle which rectifier 12 appears as a low impedance. The amount of current which will flow during this cycle is dependent upon the saturation state of core 10 at the beginning of the conducting half cycle, since winding 11 offers little inductive reactance to the flow of current when its core 10 is at or near saturation.

The second winding 15 is provided to preset the degree of saturation of core 10 during the half cycle when the load is not receiving power so that the amount of current delivered during the following half cycle may be controlled. The control winding 15 therefore is connected through rectifier 16 to an alternating power source of the same frequency and appropriate phase thus limiting its current to the half cycle when the load is not receiving power. As shown by the dot at the lower end of winding 15, it will be seen that this winding is of opposite polarity to winding 11 so that if the current carried by winding 11 tends to saturate core 10, that carried by coil 15 tends to drive it away from saturation.

In order that the control exercised by winding 15 may be used to transfer an order or intelligence to the load circuit of the amplifier, a transistor 17 is added to the control circuit. In the embodiment illustrated transistor 17 is connected with its base electrode and collector electrode in the series circuit of control winding 15. Thus the A. C. source entering terminals 19 not only supplies the energy for the control winding 15 but also, because of the rectification action of rectifier 16, supplies the D. C. energy required by the transistor collector electrode. The collector impedance and hence the current through control winding 15 may therefore be controlled by the application of a control signal to the emitter electrode of transistor 17. The control signal input is shown as terminals 20 across impedance 21. Bias for the emitter electrode is provided such as by battery 22 connected in series with impedance 21 in the emitter circuit.

Transistor 17 may alternatively be connected with the emitter common to the input and output circuits and the control signal applied to the base electrode.

In accordance with transistor theory, any voltage variation introduced across impedance 21 in Fig. 1 will vary the bias current of the emitter electrode of transistor 17 and produce, within the linear characteristics of the transistor, a corresponding variation in the collector impedance. The standard transistor action is not wholly true in this circuit inasmuch as collector current is restricted by rectifier 16 to the control half cycle of the alternating source frequency. However, the average of the control information may be accurately transferred to load circuit 13.

Figure 2:
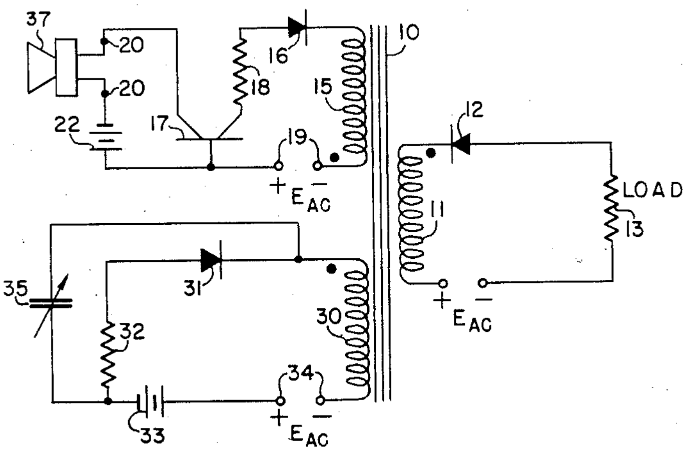
Fig. 2 is a schematic diagram of a varied embodiment of this invention.

The circuit illustrated and discussed above in connection with Fig. 1, while illustrative of this invention, and well suited for use with junction transistors, is subject to some inaccuracies when used with point contact transistors. Because the latter type of transistor carries a quiescent or zero signal collector current, it is incapable of permitting zero current in control winding 15. Since any current in winding 15 tends to reset core 10 from complete saturation during the control half cycle, maximum current can be delivered to the load during the gating half cycle only after the initial portion of the gating half cycle has been used to resaturate core 10. Therefore quiescent current in control winding 15 limits the maximum power which can be delivered to load 13. To avoid this limitation a compensating circuit has been devised and is illustrated in Fig. 2. The effect of the quiescent current of the point contact transistor can be minimized somewhat by the insertion of current limiting resistor 18 in the collector circuit. However the compensation circuit to be described permits complete compensation and when the compensation current is accurately adjusted series resistor 18 could actually be omitted as in Fig. 1.

. The compensation circuit consists of an additional control winding 30 which is wound with the same polarity as load winding 11 as indicated by the dot at the upper end of winding 30. This winding is serially connected with a rectifier 31, a current limiting impedance 32, a bias battery 33, all in series with terminals 34 connecting to the common source of alternating energy. Because of the polarity of winding 30 it tends to saturate core 10 in the same direction as load winding 11, but the polarity of its series rectifier 31 permits it to carry current only during the control or reset half cycle. Thus it will be seen that while control winding 15 is attempting to drive core 10 from saturation during the reset half cycle, the current in winding 30 is in opposition thereto and tending to drive it toward saturation. By keeping the current in winding 30 at the proper level, it will just compensate for the current in winding 15 produced by the quiescent collector current of transistor 17.

Assuming condenser 35 to be switched out of the circuit, it will observed that resistor 32 will act to limit the current flowing in control winding 30 and that this resistor should have a value selected to produce the desired compensating current for transistor 17. While the necessary compensation may be obtained in this way, adjustment of the current in control winding 30 may be obtained through variation of the value of the variable condenser 35 connected in parallel with rectifier 31 and resistor 32. When the unilateral impedance 31 is not conducting due to the polarity of the A. C. source, condenser 35 acts as an electron storage device. Since the load circuit source impedance is comparatively low, the condenser will have little effect on the core actions during the gating half cycle. During the control cycle when current through winding 30 tends to be limited by resistance 32, the condenser 35 supplies a current which acts upon core 10. Source 34 will aid this flow of current through winding 30 since the condenser 35 generally represents a lower impedance than resistor 32 at the frequencies being used. This control of resistance by capacitance permits direct utilization of sensing devices which vary capacitance with signal.

Figure 3:
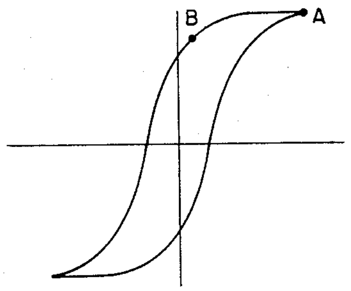
Fig. 3 is a typical hysteresis loop of a magnetic amplifier core.

The circuit of winding 30, as described in my copending patent application, filed June 1, 1953, Serial No. 358,989 will also operate to maintain delivery of full power to the load with core materials of undesirably low remanence. As observed on the curve shown in Fig. 3, a material of low remanence may slip from saturation at point A to a point B below saturation during the control half cycle since a control winding such as 15 operates only to withdraw the core from saturation and not to restore it toward saturation. Thus if the core loses saturation during the control half cycle, on the next gating half cycle the initial portion thereof will be expended in restoring the core to saturation before maximum can be delivered to the load. However the addition of another control winding polarized as winding 30 permits the supplying of a restorative current during the control half cycle to provide a saturated condition for core 10 at the beginning of the gating half cycle.

To illustrate the delicate control capabilities of the transistor control circuit, a low impedance carbon microphone 37 has been substituted for the impedance 21 of Fig. 1. It was found that signals introduced to microphone 37 could be accurately reproduced in load 13.

Obviously many modifications and variations of the present invention are possible in the light of the above teachings. It is therefore to be understood that within the scope of the appended claims the invention may be practiced otherwise than as specifically described.

What is claimed is:

1. A half cycle response time transistor controlled magnetic amplifier comprising, a saturable core, a control winding, a compensating winding, and a load winding thereon, said control winding being oppositely poled to each of said other windings, unilateral impedance means and an alternating energy source connected to each of said windings, said unilateral impedance means being poled to alternate the flow of half cycle current to said load and said other two windings, a transistor amplifier having its output serially connected with the control winding, a control signal input connected to the input circuit of said transistor amplifier, first and second resistors respectively connected in series with said control and compensating windings, the relative values of said resistors being chosen to provide a current in the compensating winding equal and opposite to that in the control winding resulting from the quiescent current of the transistor output circuits, and a variable capacitor connected in parallel with the series connection of said second resistor and the unilateral impedance in the circuit of said compensating winding.

2. A half cycle response time transistor controlled magnetic amplifier comprising, a saturable core, a control winding, a compensating winding, and a load winding thereon, said control winding being oppositely poled to each of said other windings, unilateral impedance means and an alternating energy source connected to each of said windings, said unilateral impedance means being poled to alternate the flow of half cycle current to said load and said other two windings, a transistor amplifier having its output serially connected with the control winding, a control signal input connected to the input circuit of said transistor amplifier, first and second resistors respectively connected in series with said control and compensating windings, the relative values of said resistors being chosen to establish a current in the compensating winding which provides a core flux equal and opposite to that produced by the control winding resulting from the quiescent current of the transistor output circuits, and a variable capacitor connected in parallel with the series connection of said second resistor and the unilateral impedance in the circuit of said compensating winding.

3. A half cycle response time transistor controlled magnetic amplifier comprising, a saturable core, a control winding, a compensating winding, and a load winding thereon, said control winding being oppositely poled to each of said other windings, unilateral impedance means and an alternating energy source connected to each of said windings, said unilateral impedance means being poled to alternate the flow of half cycle current to said load and said other two windings, a transistor amplifier having its output serially connected with the control winding, a control signal input connected to the input circuit of said transistor amplifier, means controlling the relative quiescent current flow in the control winding and the compensating winding to produce a compensating core flux equal and opposite to the core flux resulting from the quiescent current of the transistor output circuits, and a variable capacitor connected in parallel with the unilateral impedance in the circuit of said compensating winding.

References Cited in the file of this patent

UNITED STATES PATENTS 2,259,647 Logan ---------------- Oct. 21, 1941

(Other references on following page)

UNITED STATES PATENTS

| | | |
|---|---|---|
| 2,740,086 | Evans et al. | Mar. 27, 1956 |
| 2,753,518 | Creveling | July 3, 1956 |
| 2,795,753 | House | June 11, 1957 |

OTHER REFERENCES

Radio-Electronic Engineering, February 1954, pages 13–15 (part Fig. 3A), "Transistor Control of Magnetic Amplifiers," by G. F. Pittman, Jr.

Electronics, August 1953, pages 136–140, "Transistor Controlled Magnetic Amplifier," by Richard H. Spencer.

Electrical Engineering, pages 791–795, Ramey, "Magnetic Amplifier Circuits" (particularly Fig. 15, page 793), September 1953.